US012774238B2

(12) United States Patent
Tian et al.

(10) Patent No.: US 12,774,238 B2
(45) Date of Patent: Oct. 27, 2026

(54) METHOD FOR PREPARING ARTIFICIAL PEAT AND FULVIC ACID FROM LIVESTOCK AND POULTRY MANURE IN BREEDING INDUSTRY THROUGH HIGH-PRESSURE HYDROTHERMAL METHOD

(71) Applicant: China University of Petroleum (East China), Qingdao (CN)

(72) Inventors: Yuanyu Tian, Qingdao (CN); Yingyun Qiao, Qingdao (CN); Xinjian Qiao, Qingdao (CN); Yiliang Tian, Qingdao (CN); Jingxian Wang, Qingdao (CN); Peijie Zong, Qingdao (CN); Zhaoyue Sun, Qingdao (CN); Ruotong Cui, Qingdao (CN); Yanpeng Zhang, Qingdao (CN); Wenlong Xu, Qingdao (CN); Quan Gan, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 19/414,746

(22) Filed: Dec. 10, 2025

(65) Prior Publication Data

US 2026/0167544 A1 Jun. 18, 2026

(30) Foreign Application Priority Data

Dec. 17, 2024 (CN) ......................... 202411864669.5

(51) Int. Cl.

| | |
|---|---|
| ***C02F 11/18*** | (2006.01) |
| ***C02F 11/122*** | (2019.01) |
| ***C05F 3/00*** | (2006.01) |
| *C02F 103/20* | (2006.01) |

(52) U.S. Cl.
CPC ............ *C02F 11/18* (2013.01); *C02F 11/122* (2013.01); *C05F 3/00* (2013.01); *C02F 2103/20* (2013.01); *C02F 2303/10* (2013.01)

(58) Field of Classification Search
CPC .......... C02F 11/18; C02F 11/122; C02F 3/00; C02F 2103/20; C02F 2303/10
See application file for complete search history.

(56) References Cited

FOREIGN PATENT DOCUMENTS

| | | | |
|---|---|---|---|
| CN | 116966836 A * | 10/2023 | ................ B01J 6/00 |
| CN | 118084577 A * | 5/2024 | ............. A01C 21/00 |

* cited by examiner

*Primary Examiner* — Jennifer A Smith
(74) *Attorney, Agent, or Firm* — Calfee, Halter & Griswold LLP

(57) ABSTRACT

A method for preparing artificial peat and fulvic acid from livestock and poultry manure in the breeding industry through a high-pressure hydrothermal method includes the following steps: regulating the concentration of the livestock and poultry manure to be 10-40%, pressurizing the livestock and poultry manure, and feeding into an electromagnetic heating tube reactor and a tower type delay reactor, then separating by using a depressurization flash tower, feeding a gas phase into a preheating heat exchanger, subsequently circulating a part of flash evaporation condensate back to a livestock and poultry manure concentration adjusting tank, separating a solid phase slurry through a pressure filter; using the filtered solid as an artificial peat; pumping a filtrate into a tubular heater, heating to 380° C. or above, then desalting in a desalting tower; mixing the desalted filtrate with the remaining flash condensate to obtain a fulvic acid product.

5 Claims, 1 Drawing Sheet

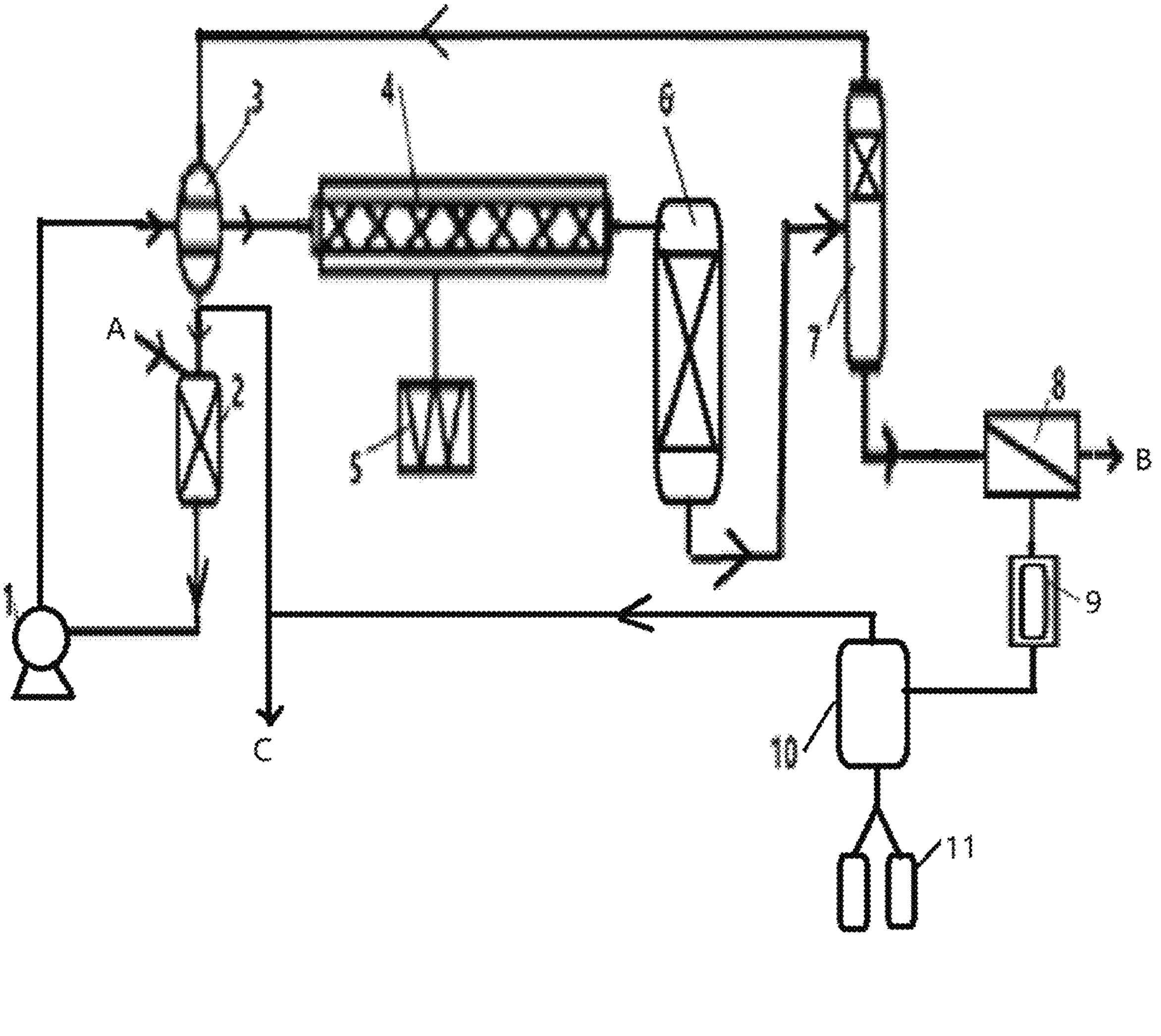
1
2
3
4
5
6
7
8
9
10
11
A
B
C

METHOD FOR PREPARING ARTIFICIAL PEAT AND FULVIC ACID FROM LIVESTOCK AND POULTRY MANURE IN BREEDING INDUSTRY THROUGH HIGH-PRESSURE HYDROTHERMAL METHOD

CROSS-REFERENCE TO RELATED APPLICATIONS

The application claims priority to Chinese Application No. 202411864669.5, filed on Dec. 17, 2024, entitled “METHOD FOR PREPARING ARTIFICIAL PEAT AND FULVIC ACID FROM LIVESTOCK AND POULTRY MANURE IN BREEDING INDUSTRY THROUGH HIGH-PRESSURE HYDROTHERMAL METHOD”, the content of which is specifically and entirely incorporated herein by reference.

FIELD

The present disclosure relates to the field of chemical engineering, in particular to a method for preparing artificial peat and fulvic acid from livestock and poultry manure in the breeding industry through a high-pressure hydrothermal method.

BACKGROUND

Along with the rapid development of the animal husbandry in China, the scale and density of livestock and poultry farming have greatly increased, and the environmental pollution problem brought forth by the livestock and poultry manure has been increasingly intensified. Livestock manure contains antibiotics, parasite ova, pathogenic bacteria, viruses and weed seeds, it also includes a large amount of nitrogen, phosphorus, potassium, and heavy metal elements (e.g., copper, zinc, arsenic) and sodium chloride derived from the addition process. If the ingredients of the livestock manure are not treated in time, on the one hand, the ingredients will cause serious crop diseases, insect pests and weeds after applying the livestock manure in farmland, causing serious pollution to land and water resources, on the other hand, the livestock manure will bring about food safety problems and air pollution caused by odor, which has not only become an important factor hampering the sustainable development of animal husbandry and agriculture, but also imposes a great challenge to rural environmental management.

Returning livestock and poultry manure to the cropland is the fundamental solution and the root remedy to the environmental problem of livestock and poultry breeding. The existing practice of high-temperature composting or fermentation of livestock and poultry manure to produce organic fertilizer can hardly kill antibiotics, parasite ova, pathogenic bacteria, viruses and weed seeds because the temperature does not exceed 80° C., making it difficult to achieve safe, clean and efficient returning of the organic fertilizers to the croplands. Livestock and poultry manure contains rich organic matter and nutrients, when the livestock and poultry manure is used as a cultivation matrix, it can provide the plant with necessary nutrients, promote plant growth and development, and improve yield and quality. There are a large number of beneficial microorganisms in livestock and poultry manure. By using livestock and poultry manure as a cultivation matrix, it can provide nutrition and suitable environmental conditions for the cultivation of microorganisms, and the microorganisms are used for the research and development and production of biological preparations or bio-fertilizers. Therefore, it is urgent to develop production processes and equipment technologies that can transform livestock and poultry manure into matrix materials suitable for plant or microbial growth, thereby achieving the effective utilization of organic matter and nutrients in the livestock and poultry manure.

SUMMARY

The present disclosure aims to overcome the defects in the prior art with respect to the livestock and poultry manure production organic fertilizer and cultivation substrate technology, and provides a method for preparing artificial peat and fulvic acid from livestock and poultry manure in the breeding industry through a high-pressure hydrothermal method. The method utilizes high-temperature and high-pressure hydrothermal decomposition and killing of antibiotics, parasite ova, pathogenic bacteria, viruses and weed seeds in the livestock manure, utilizes the property that the sodium chloride is insoluble in the supercritical water to remove heavy metal elements and sodium chloride in the hydrolyzed fulvic acid, eradicates the two major difficult problems of antibiotics, disease, insect pests and weeds, heavy metals and sodium chloride damage that are difficult to be solved in the existing process of producing organic fertilizers with the livestock and poultry manure, thereby ensuring the safe, clean and efficient disposal of the livestock and poultry manure and returning the green and organic fertilizers to the cropland.

To achieve the above object, the present disclosure provides a method for preparing artificial peat and fulvic acid from livestock and poultry manure in the breeding industry through a high-pressure hydrothermal method, wherein the method comprises the following steps:

Regulating the concentration of the livestock and poultry manure to be 10-40% by using a part of flash condensate, then pressurizing the livestock and poultry manure by using a high-pressure pump 1 and feeding it into an electromagnetic heating tube reactor 4 for carrying out the hydrothermal decomposition reaction, wherein the flow rate inside the tube is within the range of 1-5 m/s, the reaction temperature is within the range of 200-330° C., the pressure is not lower than the saturation pressure of water under the reaction temperature, and the reaction time is within the range of 1-90 seconds; then feeding the livestock and poultry manure into a tower type delay reactor 6 to extend the reaction time for 10-50 minutes to further enhance the hydrothermal decomposition reaction; subsequently passing the hydrothermal reaction slurry at the bottom of the tower type delay reactor 6 through a depressurization flash tower 7 to perform a gas-solid separation to obtain a gas phase and a solid phase slurry, feeding the gas phase into a preheating heat exchanger 3 and subjected to cooling and liquefying, subsequently circulating a part of flash evaporation condensate back to a livestock and poultry manure concentration adjusting tank 2, separating the solid phase slurry through a pressure filter 8; using the filtered solid as an artificial peat product; pumping a filtrate into a tubular heater 9 by a high pressure pump, heating to 380° C. or above, then desalting in a supercritical settler 10, separating the salt from a desalination tank 11, recovering waste heat from the filtrate, mixing the desalted and cooled filtrate with the remaining flash condensate to obtain a fulvic acid product.

Due to the aforementioned technical scheme, the present disclosure produces the favorable effects as follows: the present disclosure utilizes high-temperature and high-pressure hydrothermal decomposition and killing of antibiotics, parasite ova, pathogenic bacteria, viruses and weed seeds in the livestock manure, utilizes the property that the sodium chloride is insoluble in the supercritical water to remove heavy metal elements and sodium chloride in the hydrolyzed fulvic acid, eradicates the two major difficult problems of antibiotics, disease, insect pests and weeds, heavy metals and sodium chloride damage that are difficult to be solved in the existing process of producing organic fertilizers with the livestock and poultry manure, thereby ensuring the safe, clean and efficient disposal of the livestock and poultry manure and returning the green and organic fertilizers to the cropland.

BRIEF DESCRIPTION OF THE DRAWINGS

FIG. 1 illustrates a schematic diagram of the present disclosure.

DESCRIPTION OF REFERENCE SIGNS

1 High pressure feeding pump;
2 Livestock and poultry manure concentration adjusting tank;
3 Preheating heat exchanger;
4 Electromagnetic heating tube reactor;
5 Electromagnetic heating controller;
6 Tower type delay reactor;
7 Depressurization flash tower;
8 Pressure filter;
9 Tubular heater;
10 Supercritical settler;
11 Desalination tank;
A Livestock and poultry manure inlet;
B Artificial peat outlet;
C Fulvic acid outlet.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

As shown in FIG. 1, the present disclosure provides a method for preparing artificial peat and fulvic acid from livestock and poultry manure in the breeding industry through a high-pressure hydrothermal method, wherein the method comprises the following steps:

Regulating the concentration of the livestock and poultry manure added from the livestock and poultry manure inlet A to be within the range of 10-40% in the livestock and poultry manure concentration adjusting tank 2 by using a part of flash condensate obtained from a preheating heat exchanger 3, then pressurizing the livestock and poultry manure by using a high-pressure pump 1 and feeding it into an electromagnetic heating tube reactor 4 for carrying out the hydrothermal decomposition reaction, wherein the flow rate inside the tube is within the range of 1-5 m/s, the reaction temperature is within the range of 200-330° C., the pressure is not lower than the saturation pressure of water under the reaction temperature, and the reaction time is within the range of 1-90 seconds; then feeding the livestock and poultry manure into a tower type delay reactor 6 to extend the reaction time for 10-50 minutes to further enhance the hydrothermal decomposition reaction; subsequently passing the hydrothermal reaction slurry at the bottom of the tower type delay reactor 6 through a depressurization flash tower 7 to perform a gas-solid separation to obtain a gas phase and a solid phase slurry, feeding the gas phase into a preheating heat exchanger 3 and subjected to cooling and liquefying, subsequently circulating a part of flash evaporation condensate back to a livestock and poultry manure concentration adjusting tank 2, separating the solid phase slurry through a pressure filter 8; using the filtered solid as an artificial peat product; pumping a filtrate into a tubular heater 9 by a high pressure pump, heating to 380° C. or above, then desalting in a supercritical settler 10, separating the salt from a desalination tank 11, recovering waste heat from the filtrate, mixing the desalted and cooled filtrate with the remaining flash condensate to obtain a fulvic acid product.

According to the present disclosure, the electromagnetic heating tube reactor 4 is operated under the action of an electromagnetic heating controller 5, the self-mixing reinforced internal components at the cylinder wall and interior of said electromagnetic heating tube reactor 4 generate vortex to perform self-heating when a high-frequency alternating current generates an alternating magnetic field through coils, thereby achieving the uniform heating, rapid temperature rise and hydrothermal reaction of high-pressure alkaline mineral pulp, wherein the self-mixing reinforced internal components have a regular packing type, an X-cross plate type, or a spiral plate type.

According to the present disclosure, the tower type delay reactor 6 has a high-diameter ratio of (3-30):1, and contains packing components, self-mixing grid components, or an empty tower inside.

According to the present disclosure, the depressurization flash tower 7 is disposed with 1-2 stages, and the heat exchanger for cooling and liquefying the flash evaporation high temperature steam is a coil-type heat exchanger.

According to the present disclosure, the bottom of said supercritical settler 10 connects with two and more desalination tanks 11 through a shut-off valve.

The present disclosure will be described in detail below with reference to examples.

Example 1

The example served to illustrate a method for preparing artificial peat and fulvic acid from livestock and poultry manure in the breeding industry through a high-pressure hydrothermal method.

As shown in FIG. 1, the specific reaction conditions and experimental results were as follows: the livestock and poultry manure solution with a concentration of 30 wt % was subjected to the hydrothermal reaction in an electromagnetic heating tube reactor 4 at a flow rate of 2 m/s, a temperature of 280° C., and a pressure of 2.7 MPa for 10 seconds, and then subjected to the delayed reaction in a tower delay reactor for 50 minutes; the filtrate was further fed into a tubular heater 9 and a supercritical settler 10 by a high-pressure pump, and heated to a temperature of 380° C. for desalination, the brown and black humic acid contained 46.5% of artificial peat, with a yield of 15%, the remaining was fulvic acid with a concentration of 21%. The product did not contain antibiotics, parasite ova, pathogenic bacteria, viruses and weed seeds, heavy metal elements and salts.

The present disclosure provided a method for preparing artificial peat and fulvic acid from livestock and poultry manure in the breeding industry through a high-pressure hydrothermal method, wherein the high-pressure hydrothermal decomposition was performed by a an electromagnetic heating tube reactor, a tower type delay reactor was used for intensifying the hydrothermal decomposition and killing the antibiotics, parasite ova, pathogenic bacteria, viruses and weed seeds in the livestock manure, the hydrothermal reaction slurry was then subjected to flash evaporation and separation, the heavy metal elements and sodium chloride in the hydrolyzed fulvic acid was further removed by using the property that the sodium chloride was insoluble in the supercritical water, an artificial peat with similar properties with the natural peat was prepared, with a yield of 48% or more (dry basis yield), and a fulvic acid with a pH of 3-4 was obtained, the electromagnetic heating energy consumption was reduced by 30%, the method eradicated the two major difficult problems of antibiotics, disease, insect pests and weeds, heavy metals and sodium chloride damage that were difficult to be solved in the existing process of producing organic fertilizers with the livestock and poultry manure, thus ensured the safe, clean and efficient disposal of the livestock and poultry manure and returning the green and organic fertilizers to the cropland.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A method for preparing artificial peat and fulvic acid from livestock and poultry manure in the breeding industry through a high-pressure hydrothermal method, wherein the method comprises the following steps:

in a livestock and poultry manure concentration adjusting tank (2), regulating the concentration of the livestock and poultry manure to be 10-40%;

then pressurizing the livestock and poultry manure by using a high-pressure pump (1) and feeding it into an electromagnetic heating tube reactor (4) for carrying out the hydrothermal decomposition reaction, wherein the flow rate inside the tube is within the range of 1-5 m/s, the reaction temperature is within the range of 200-330° C., the pressure is not lower than the saturation pressure of water under the reaction temperature, and the reaction time is within the range of 1-90 seconds;

then feeding the livestock and poultry manure into a tower type delay reactor (6) to extend the reaction time for 10-50 minutes to further enhance the hydrothermal decomposition reaction;

subsequently passing the hydrothermal reaction slurry at the bottom of the tower type delay reactor (6) through a depressurization flash tower (7) to perform a gas-solid separation to obtain a gas phase and a solid phase slurry, feeding the gas phase into a preheating heat exchanger (3) and subjected to cooling and liquefying to obtain a flash evaporation condensate, subsequently circulating a part of the flash evaporation condensate back to the livestock and poultry manure concentration adjusting tank (2), separating the solid phase slurry through a pressure filter (8) to obtain a filtrate and a filtered solid;

using the filtered solid as an artificial peat product;

pumping the filtrate into a tubular heater (9) by a high pressure pump, heating to 380° C. or above, then desalting in a supercritical settler (10), separating the salt from a desalination tank (11), recovering waste heat from the filtrate, mixing the desalted and cooled filtrate with the remaining flash evaporation condensate after circulating to obtain a fulvic acid product.

2. The method for preparing artificial peat and fulvic acid from livestock and poultry in the breeding industry through a high-pressure hydrothermal method according to claim 1, wherein the electromagnetic heating tube reactor (4) is operated under the action of an electromagnetic heating controller (5), one or more self-mixing reinforced internal components at a cylinder wall and interior of said electromagnetic heating tube reactor (4) generate vortex to perform self-heating when a high-frequency alternating current generates an alternating magnetic field through coils, wherein the one or more self-mixing reinforced internal components have a regular packing type, an X-cross plate type, or a spiral plate type.

3. The method for preparing artificial peat and fulvic acid from livestock and poultry in the breeding industry through a high-pressure hydrothermal method according to claim 1, wherein the tower type delay reactor (6) has a height diameter ratio of (3-30):1, and contains packing components, self-mixing grid components, or an empty tower inside.

4. The method for preparing artificial peat and fulvic acid from livestock and poultry in the breeding industry through a high-pressure hydrothermal method according to claim 1, wherein the depressurization flash tower (7) is disposed with 1-2 stages, and the heat exchanger for cooling and liquefying the flash evaporation high temperature steam is a coil-type heat exchanger.

5. The method for preparing artificial peat and fulvic acid from livestock and poultry in the breeding industry through a high-pressure hydrothermal method according to claim 1, wherein the bottom of said supercritical settler (10) connects with two and more desalination tanks (11) through a shut-off valve.

* * * * *